United States Patent [19]

Sutton, Jr.

[11] 4,358,581

[45] Nov. 9, 1982

[54] POLYIMIDE MANUFACTURE

[75] Inventor: Richard F. Sutton, Jr., Circleville, Ohio

[73] Assignee: E. I. Du Pont de Nemours and Company, Wilmington, Del.

[21] Appl. No.: 213,325

[22] Filed: Dec. 5, 1980

[51] Int. Cl.$^3$ ............................................. C08G 63/10
[52] U.S. Cl. .................................... 528/353; 528/125; 528/126; 528/128; 528/188; 528/229
[58] Field of Search ............... 528/353, 125, 126, 128, 528/188, 229

[56] References Cited

U.S. PATENT DOCUMENTS

| | | | |
|---|---|---|---|
| 3,179,630 | 4/1965 | Endrey | 260/78 |
| 3,179,633 | 4/1965 | Endrey | 260/78 |
| 3,179,634 | 4/1965 | Edwards | 260/78 |
| 3,342,774 | 9/1967 | Hoegger | 260/47 |
| 3,356,648 | 12/1967 | Rogers | 260/47 |
| 3,356,759 | 12/1967 | Gerow | 260/857 |
| 3,356,760 | 12/1967 | Matray | 260/857 |
| 3,410,826 | 11/1968 | Endrey | 260/47 |
| 3,420,795 | 1/1969 | Angelo | 260/47 |
| 3,541,057 | 11/1970 | Kreuz | 260/78 |
| 3,546,175 | 12/1970 | Angelo | 260/65 |

Primary Examiner—Melvyn I. Marquis

[57] ABSTRACT

A process is disclosed for manufacturing high molecular weight polyimide from a chilled solution which includes a polyamide acid prepolymer, a finishing component, and a converting system wherein, when the solution is heated, polyamide acid polymer is formed and converted to polyimide.

12 Claims, No Drawings

POLYIMIDE MANUFACTURE

DESCRIPTION

1. Field of the Invention

This invention relates to manufacture of high molecular weight polyimide and particularly relates to manufacture of shaped articles of high molecular weight polyimide.

The process of the invention utilizes solutions of increased concentration and decreased viscosity compared with solutions of the prior art.

2. Background Art

The general manufacture of high molecular weight polyimide by converting polyamide acid is well known. For example, U.S. Pat. Nos. 3,179,630, 3,179,633, and 3,179,634 describe such processes.

Shaped articles of polyimide have been made by shaping a solution of polymerized polyamide acid and then converting that polyamide acid to polyimide. Shaped solutions of the polyamide acid have necessarily been of relatively low concentration or of relatively high viscosity and difficult to handle. U.S. Pat. No. 3,356,648 discloses addition of a polyamide acid-to-polyimide converting system to a solution of polyamide acid having an inherent viscosity of at least 0.6 in a system of substantially equimolar monomeric components. In that patent all of the polyamide acid component materials have been added and polymerized prior to addition of the converting system.

U.S. Pat. No. 3,410,826 discloses a delayed conversion of polyamide acid to polyimide by adding the conversion agents to a solution of completely polymerized polyamide-acid at a temperature low enough that the system remains essentially inactive.

Under the teaching of that patent, the cooled polyamide acid, with conversion agent added, is shaped and then warmed to permit conversion. The patent teaches that gelation can be prevented for a long time after addition of the conversion agents; however, there is no disclosure of any addition of polyamide-acid monomers concurrent with addition of the conversion agent.

U.S. Pat. No. 3,342,774 discloses that solutions of completely unpolymerized components, reactive to make polyamide-acid and convert to polyimide, can be combined by very rapid mixing to yield a polyamide-acid which is, in turn, imidized.

U.S. Pat. No. 3,541,057 discloses that certain converting agents can be added to solutions of completed polyamide-acid prior to forming the polyamide-acid into a shaped article. The polyamide-acid, it is disclosed, can be stored at low temperatures without substantial imidization and can be formed cool and then heated for conversion to polyimide.

DISCLOSURE OF THE INVENTION

According to this invention, there is provided a process for manufacturing a high molecular weight polyimide comprising the steps of establishing a polymerization solution of prepolymer of polyamide-acid oligomer, a finishing component of a monomer polymerizable with the prepolymer in an amount to yield a high molecular weight polyamide acid, and a conversion system of materials to convert polyamide acid, once formed, into polyimide, all maintained below the temperature at which the monomer and the prepolymer are relatively unreactive and then warming the solution above that temperature to cause a polymer of the polyamide-acid to form and, once formed, to be converted, by the conversion system, into high molecular weight polyimide.

There are believed to be two factors in the process of the present invention which contribute to maintenance of a low viscosity in the polymerization solution. First, the solution, as it is established, is kept at a relatively low temperature such as below about 25° or 30° C. and, for most systems, preferably below about 10° or 15° C. Five degrees Celsius is usually used and at less than $-10°$ C. the solution viscosities are large. The low temperature reduces the polymerization rate and, thereby, slows any increase in viscosity. That low temperature is herein termed the polyamidization temperature. Second, unexpectedly and for reasons not entirely understood, the conversion system appears to interfere with the polymerization until the solution is warmed. It is believed that either of the factors used alone would not be sufficient to provide a technically feasible process; but when used in combination, the result is a process having practical operational parameters and yielding a high quality, high molecular weight, polyimide product. For the process to be successfully practiced, the conversion system must be a part of the established polymerization solution before the temperature of the solution is increased.

It is believed that, at the conditions which are specified for the process of this invention, the conversion reaction of the polymer of polyamide acid into polyimide proceeds at a slower rate than the polymerization reaction of prepolymer into the polymer of polyamide acid. The basis for this invention rests in the realization that shaped articles can be formed from a solution of polyamide acid prepolymer, finishing component, and conversion system and then, because of the different reaction rates and the method and order of combining materials, the prepolymer can be polymerized to a polymer of polyamide acid and that polymer can be converted to a polyimide;—the polyimide, of course, retaining the form of the initial shaped article.

In the practice of this invention, there is no need for the two distinct and separately accomplished steps of preparing a high molecular weight polyamide acid and then converting the polyamide acid to a polyimide. In this invention, the two steps are conducted concurrently without undesired chemical complications and at a considerable savings in time and energy. Moreover, because the starting solution has oligomers and monomer reactants instead of high molecular weight polyamide acids, the concentration of reactants can be quite high without encountering the unworkably high viscosities of concentrated high molecular weight polyamide acid solutions.

As an additional benefit, it has been discovered that some polyimide material which results from practice of the process of this invention exhibits an increased resistance to chemical attack, for instance, such polyimide exhibits a reduced rate of etching in aqueous sodium hydroxide. This effect is believed to be an indication that such polyimide is more branched or crosslinked than a polyimide made by the prior art method of complete polyamide acid polymerization followed by separate and subsequent conversion steps.

For the purpose of describing this invention, "prepolymer" is either an amine-terminated polyamide acid oligomer of diamine and tetracarboxylic acid dianhydride or a dianhydride-terminated polyamide-acid oligomer of tetracarboxylic acid dianhydride and diamine having an inherent viscosity of about 0.3 to 1.6 as determined in 0.5 g/dl concentration in dimethylacetamide at 30° C. and a Brookfield viscosity, in 80 weight percent of dimethylacetamide at about 25° C., of about 1 to 300,000 centipoises. The prepolymer can have an excess of diamine or dianhydride in the mole ratio range of from about 1.01 to 1.50 of one component to the other. A mole ratio of 1.02 to 1.20 is preferred and most usually used. As stated, the prepolymer can also be made with an excess of tetracarboxylic acid dianhydride; and, when such is the case, it is believed that the acid dianhydride to diamine mole ratio can be from about 1.01 to 1.50; and from about 1.02 to 1.20 is preferred.

For the purpose of describing this invention, "finishing component" is a solution including either a diamine for use with dianhydride-terminated prepolymer or a tetracarboxylic acid dianhydride for use with diamine-terminated prepolymer. A particular finishing solution is prepared for use with each prepolymer and the concentration of materials in the solution is adjusted to provide the stoichiometrically desired amount of diamine or dianhydride monomer in a volume of solvent predetermined to yield the desired viscosity or gel firmness when combined with the prepolymer.

For the purpose of describing this invention, "conversion system" is a lower fatty acid anhydride or a tertiary amine or a combination of those materials.

The diamine and tetracarboxylic acid dianhydride components of the prepolymer are used in an amount which will provide a polymerization solution of relatively low viscosity, in the range of about 5 to 30,000 poises, and preferably about 40 to 4000 poises, at 25° C. The polymerization solution can be about 5 to 60 weight percent prepolymer, and 15 to 40 is preferred. The lower concentration limits are generally a matter of convenience and reaction efficiency. The higher concentration limits are, of course, determined by viscosity and whether the solutions can be handled. The process of this invention is particularly suitable for making polyimide from a high concentration prepolymer solution and, for such high concentration manufacture, prepolymer can be used at levels of 15 to 40 weight percent, or perhaps slightly higher. At concentrations appreciably below about 15 weight percent, the benefit of high concentration manufacture is not fully realized; and above about 40 weight percent the viscosity of the prepolymer solution is so high that handling and shaping the solution becomes difficult. The present invention is usually practiced with prepolymer in solution at a concentration of about 20 to 35 weight percent because the combination of overall solvent in the system and the viscosity characteristics of solutions of the usually-used component materials is most favorable in that concentration range.

The polyimides prepared by the process of the present invention, display outstanding physical and chemical properties which make them very useful as shaped structures.

The polyimides are represented by combining at least one organic diamine having the structural formula:

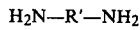

wherein R' is a divalent radical containing at least 2 carbon atoms and the two amino groups of said diamine are each attached to separate carbon atoms of said divalent radical; with at least one tetracarboxylic acid dianhydride having the structural formula:

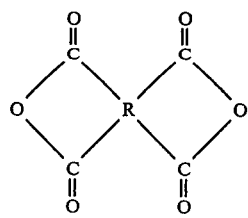

wherein R is a tetravalent radical containing at least 2 carbon atoms and no more than 2 carbonyl groups of said dianhydride are attached to any one carbon atom of said tetravalent radical.

A variety of eligible diamines and tetracarboxylic acid dianhydrides are disclosed in previously-mentioned U.S. Pat. No. 3,179,630 incorporated herein by reference. Exemplary, preferred, ones of the diamines are as follows: metaphenylene diamine; paraphenylene diamine; benzidine;

4,4'-diamino-diphenyl propane; hexamethylenediamine;

4,4'-dimethylheptamethylene diamine;

4,4'-diaminodiphenyl ether; and 4,4'-oxydianiline.

Exemplary, preferred, ones of the tetracarboxylic acid dianhydrides are as follows:

pyromellitic dianhydride; benzophenone
tetracarboxylic dianhydride; naphthalene
tetracarboxylic dianhydride; and diphenyl
tetracarboxylic dianhydride.

There is no requirement that the dianhydride or the diamine of the finishing solution must be the same as the dianhydride or the diamine of the prepolymer. The reactive component of the finishing solution can be the same as the corresponding component in the prepolymer or it can be different; and the finishing solution and the prepolymer can have combinations or mixtures of reactive components.

The conversion system comprises materials capable of converting polyamide acid to polyimide. Lower fatty acid anhydrides and tertiary amines can be used as the conversion system with or without the presence of other solvent materials. Exemplary, eligible, lower fatty acid anhydrides are: acetic anhydride; propionic anhydride; aliphatic ketenes; acetic formic anhydrides; n- and iso-butyric anhydride; and acetic benzoic anhydride and mixtures of those anhydrides. Acetic anhydride and ketene are preferred. Ketenes are regarded as anhydrides of carboxylic acids, derived from drastic dehydration of the carboxylic acids.

Exemplary, eligible tertiary amines are: pyridine, 3,4- and 3,5-lutidine, 3- and 4-methyl pyridine, N-dimethyl benzylamine, isoquinoline, N-dimethyl dodecylamine and mixtures of those amines.

While the presence of a lower fatty acid anhydride is essential to the conversion system, presence of a tertiary amine is not. A tertiary amine in the conversion system is believed to accelerate the conversion reaction and, if such effect is not desired or required, the tertiary amine can be omitted. When a combination of the anhydrides and the amines is used, the anhydrides and amines are preferably used in approximately equimolar amounts.

The solvent used in the practice of this process should be of a kind which does not react, in significant degree, with any of the other components of the system and which does not interfere with any of the reactions leading to the polyimide product. The solvent should dissolve the diamine component, the dianhydride component, and the components of the conversion system. It is also preferred that the solvent dissolve the polyamide acid at least to some degree. Eligible solvents are: N,N-dimethylformamide and N,N-dimethylacetamide, which are preferred because they are easily removed from the polymerization solution by evaporation, diffusion, or displacement; N,N-diethylformamide; N,N-diethylacetamide; N,N-dimethylmethoxyacetamide; dimethylsulfoxide; and mixtures of those solvents.

To prepare polyimide by this invention, a polymerization solution is prepared and maintained below the polyamidization temperature—that is, the temperature above which the prepolymer and the finishing component would rapidly polymerize. The polymerization solution is then shaped, such as by being extruded into a film or fiber and warmed to permit amidization and subsequent imidization. The polymerization solution is prepared by first making the prepolymer at the desired diamine-to-dianhydride mole ratio and at the desired concentration in the solvent system chosen for the polymerization. Next, the prepolymer is cooled below the polyamidization temperature—below about 25° to 30° C. and above about $-10°$ C. for most polymerizing systems, 5° C. is usually used. The finishing component and, then, the conversion system are mixed with the prepolymer, and the resulting polymerization solution is formed into any desired final shape. It should be noted that the chilled, concentrated, polymerization solution has the consistency of a gel shortly after it is formed into a shaped article. Finally, the temperature of the polymerization solution is increased to cause solvent evaporation, gelling, amidization, and imidization. Imidization has been found to proceed at an acceptable rate above about 25° C. and preferably between 40° and 160° C. When polyimide films are made, the warming step to convert polyamide acid to polyimide is followed by a heat treating step which includes exposure of the polyimide to temperatures of about 200° to 400° C. for a period of up to about 30 minutes or perhaps slightly longer.

DESCRIPTION OF THE PREFERRED EMBODIMENTS

Example 1

Preparation of Polyimide

As an example of the practice of this invention: 4,4'-oxydianiline (34.19 g, 0.1707 mole) and pyromellitic dianhydride (35.33 g, 0.1620 mole) were dissolved in dimethylacetamide (150 ml) and agitated at 25° C. to make a prepolymer solution with a Brookfield viscosity of 5800 poises. To determine the proper combination of component solutions, a 50 gram sample of the polyamide acid prepolymer solution was diluted with 39 milliliters of dry dimethyl acetamide and viscosity measurements of the system were made with addition of increasing amounts of a six weight percent solution of pyromellitic dianhydride in dimethylacetamide at about 25° C. Addition of 11 milliliters of the dianhydride solution resulted in a maximum viscosity and was taken to be the appropriate amount of solution for this example.

A polymerization solution was prepared by combining 25 grams of the polyamide acid prepolymer solution with 7.5 milliliters of dimethylacetamide chilled to about 5° C. or less and adding a finishing component of 5.5 milliliters of a six weight percent solution of pyromellitic dianhydride in dimethylacetamide, followed by a conversion system of 4.2 milliliters of acetic anhydride, and 1.1 milliliters of 3-methyl pyridine as a tertiary amine, all chilled to about 5° C. or less. The resulting polymerization solution, at about 5° C., exhibited a Brookfield viscosity of less than about 1340 poises and had a concentration of 20 weight percent of polymerizable materials.

The chilled polymerization solution was coated onto a glass plate using a coating bar with a 0.38 millimeter (15 mil) gap and then heated for 60 minutes at 54° C. to make a gel film. The gel film was then clipped into a frame and dried for 20 minutes at 300° C. and then for 10 minutes at 400° C. The resulting film exhibited a tensile strength of $1.2 \times 10^8$ pascal (18,000 psi) and an elongation to break of 21%.

Example 2

Comparative Preparation of Polyimides

For this example, a prepolymer was used having a mole ratio of 1.04 of 4,4'-oxydianiline to pyromellitic dianhydride. The prepolymer was dissolved in dimethylacetamide to yield a solution with a concentration of 19.6 weight percent and a Brookfield viscosity of about 70 poises at 25° C.

The following components, all chilled to 5° C. or lower, were combined in the order mentioned: 30 grams of the prepolymer solution; 7.5 milliliters of dimethylacetamide; 1 milliliter of six weight percent pyromellitic dianhydride in dimethylacetamide; 3.5 milliliters of acetic anhydride; and 2.2 milliliters of 3-methyl pyridine.

The resulting, chilled, polymerization solution, having a solution viscosity less than 200 poises at 5° C. was poured onto a ferrochrome plate and held for two minutes at 100° C. using a 0.36 millimeter (14 mil) shim to make a gel film. The film was then exposed for 20 minutes at 300° C. and for 10 minutes at 400° C. to dry and cure.

As a comparison example of the prior art wherein the whole of the diamine and dianhydride components are reacted together before polyimide formation, the same amount of the same prepolymer as above was dissolved in the same amount of dimethylacetamide and was reacted with the same amount of six weight percent pyromellitic dianhydride in dimethylacetamide. The resulting, completed, polyamide acid solution, ready for conversion to polyimide, had a concentration of 19.1 weight percent and exhibited a Brookfield viscosity of 2000–3000 poises at 25° C. The polyamide acid solution was chilled to about 5° C. where it exhibited a Brookfield viscosity of about 3600–5400 poises. The same kind and amounts of converting materials and tertiary amine, at a temperature of about 5° C., were added to and dissolved in the polyamide acid solution.

The chilled polyamide acid system was coated onto a glass plate to a thickness of 0.38 millimeters (15 mils), heated for 30 minutes at about 66° C., and then dried in a frame for 20 minutes at 300° C. and 10 minutes at 400° C. The viscosity of the polyamide acid system was so great that a bubble-free film could not be made by pouring the solution and containing it in a frame as was done in the above example of the invention.

The film of this invention and the comparison example were tested with regard to certain strength and stability properties. The results of those tests are set out in the following table and the test conditions and procedures are described thereafter.

| Test | This Invention | Comparison Example |
|---|---|---|
| Young's Modulus at: | | |
| 25° C. (MPa) | 2350 | 2490 |
| 200° C. (MPa) | 1400 | 1410 |
| Tensile Strength at: | | |
| 25° C. (MPa) | 143 | 144 |
| 200° C. (MPa) | 89 | 90 |
| Elongation to Break at: | | |
| 25° C. (%) | 44 | 25 |
| 200° C. (%) | 58 | 26 |
| Elongation to Break after 8 hr. aging at 400° C. and measured at: | | |
| 25° C. (%) | 6.1 | 4.8 |

Measurements were made using a sample geometry of length twice width and a tensile tester pulling rate of 100% per minute.

In addition to the similarities indicated in the above table, infrared absorption and thermogravimetric analyses for the two materials were chemically substantially identical.

The differences in elongation values are believed to be due to the manner of preparing the samples rather than to differences in the material. The material of this invention was poured to make a film while the material of the comparison example had to be coated due to the major difference in viscosity.

As an additional comparison example, all of the individual components, of the same kind and amount used in the above example, were chilled and combined without provision for generation of the prepolymer. The mixture, which was very low in viscosity, even at 5° C., did not result in high molecular weight polymer when warmed. A film of this mixture, cast and warmed as in the preceding examples, crumbled into pieces when lifted from the casting plate.

Example 3

Preparation of Polyimide with Direct Comparisons of Viscosity

For this example, 60 grams of the prepolymer of Example 2 were dissolved with 15 milliliters of dimethylacetamide and chilled to about 5° C. The Brookfield viscosity of the resulting prepolymer solution was 26 poises. To that solution, 2 milliliters of chilled, six weight percent solution of pyromellitic dianhydride were blended. The viscosity of that blend was 64 poises, indicating that some reaction had taken place. To the blend was added 7.6 milliliters of chilled acetic anhydride and 4.4 milliliters of chilled 3-methyl pyridine. Due to dilution, the viscosity was reduced to 52 poises upon addition of those components. The chilled solution, at that viscosity, was coated onto glass plates and warmed for about 30 minutes at about 120° C. to yield a solid film.

As a comparison, the same amounts of the prepolymer and the six weight percent solution of pyromellitic dianhydride were stirred together for 60 minutes at about 25° C. to make a completed polymerized polyamide acid solution exhibiting a viscosity of 3400 poises at 25° C. That solution was diluted with the 15 milliliters of dimethylacetamide to yield a solution which exhibited a viscosity, at 5° C., of 484 poises. To that viscous polyamide acid solution, was added 7.6 milliliters of chilled acetic anhydride and 4.4 milliliters of chilled 3-methyl pyridine. The viscosity was reduced to 418 poises upon addition of those components. The chilled, viscous, solution was coated onto a glass plate and warmed as above to yield a solid film.

These examples demonstrate that, at equivalent solution concentrations, the starting polymer components of the prior art have a viscosity of more than five times greater than the viscosity of starting polymer components of this invention; and, more importantly, the final polymerizing solution of the prior art has a viscosity of more than eight times greater than the viscosity of the equivalent solution in this invention.

Example 4

Preparation of Polyimide from Prepolymer with Excess Dianhydride

A prepolymer with excess dianhydride was prepared by reacting 4,4'-oxydianiline (40.00 g, 0.20 mole) with pyromellitic dianhydride (47.65 g, 0.22 mole) in 383.4 g of dimethylacetamide under conditions as described above to make a polyamide acid solution at 18.6 weight percent.

As described in Example 1, above, to determine the correct amount of component solutions, it was found that 1.0 milliliter of a six weight percent solution of 4,4'-oxydianiline in dimethylacetamide added to 10 grams of the polyamide acid solution resulted in a maximum viscosity and such amount was taken to be the appropriate amount for this example.

The chilled polymerization solution was coated onto glass plates, warmed, clipped into a frame, and dried for 30 minutes at 300° C. The resulting film exhibited a tensile strength of $0.88 \times 10^8$ pascal (12800 psi) and an elongation to break of 8%.

The major benefit of this invention demonstrated by these examples, that is, a high concentration, low viscosity, solution system which yields high molecular weight polyimide, is entirely the result of the discovery that the amidization and the imidization reactions can be conducted in the same reaction vessel at the same time and need not be conducted separately or in individual vessels.

Industrial manufacture of shaped articles in accordance with this invention permits casting or extruding the cold, low viscosity, high concentration, polymerization solution into the desired shape and then heating the shape. For example, in the manufacture of a film, the high concentration polymerization solution can be deposited onto a warmed casting drum to make a self-supporting web and then removed from the drum and heat-treated to yield a polyimide film. Films of any thickness can be made although the range of thicknesses is usually from about 0.02 to 2 millimeters. Other shapes can, of course, be made, for example, tubes and beam members can be extruded and individual shaped articles can be cast.

The materials of this invention can be dyed or filled with any additive material which does not interfere adversely with the polymerization reactions. Such inert materials as carbon black, silica, titania, and the like are eligible fillers.

I claim:

1. A process for manufacturing a high molecular weight polyimide comprising the steps of
    (a) establishing a polymerization solution of
        (i) polyamide acid prepolymer, (ii) a finishing component polymerizable with the prepolymer to yield polyamide acid polymer, and (iii) a conversion system to convert polyamide acid polymer to polyimide polymer, the temperature of the solution being maintained below the polyamidization temperature and (b) warming the solution to cause polymerization of the prepolymer and the finishing component whereby, as the prepolymer is polymerized with the finishing component, it is converted, by the conversion system, into high molecular weight polyimide.

2. The process of claim 1 wherein a shaped polyimide article is manufactured by shaping the solution before the warming step.

3. Polyimide made by the process of claim 1.

4. The process of claim 1 wherein the polyamide acid prepolymer is amine-terminated and is derived from reaction between a tetracarboxylic acid dianhydride and an excess of diamine.

5. The process of claim 4 wherein the mole ratio of diamine to dianhydride in the prepolymer is from 1.02 to 1.20.

6. The process of claim 1 wherein the polyamide acid prepolymer is dianhydride-terminated and is derived from reaction between a diamine and an excess of a tetracarboxylic acid dianhydride.

7. The process of claim 6 wherein the mole ratio of dianhydride to diamine in the prepolymer is from 1.02 to 1.20.

8. The process of claim 1 wherein the finishing component is present in an amount stoichiometrically required to yield a substantially equimolar balance between diamine and dianhydride in the polymerization solution.

9. The process of claim 4 wherein the finishing component is a dianhydride and is present in an amount stoichiometrically required to yield a substantially equimolar balance between diamine and dianhydride in the polymerization solution.

10. The process of claim 6 wherein the finishing component is a diamine and is present in an amount stoichiometrically required to yield a substantially equimolar balance between diamine and dianhydride in the polymerization solution.

11. The process of claim 1 wherein the polymerization solution includes from 15 to 40 weight percent polyamide acid prepolymer.

12. The process of claim 1 wherein the polymerization solution is established by mixing the finishing component, at a temperature of less than 25° C. and greater than −10° C., with the prepolymer also at a temperature of less than 25° C. and greater than −10° C.; and then, to that mixture, adding the conversion system at a temperature of less than 25° C. and greater than −10° C.

* * * * *